United States Patent [19]

Kuzub et al.

[11] Patent Number: 5,318,444
[45] Date of Patent: Jun. 7, 1994

[54] GRAIN STORAGE UNLOADING SYSTEM

[76] Inventors: Danny S. Kuzub, 224 Devonshire Drive; Henry Derksen, 43 Salisbury Crescent; Joseph Kuffner, 42 Camelot Street, all of Winnipeg, Manitoba, Canada

[21] Appl. No.: 872,241

[22] Filed: Apr. 23, 1992

[51] Int. Cl.⁵ ............................. B65G 65/46
[52] U.S. Cl. ............................. 414/326; 414/318; 414/319; 414/526; 414/523; 198/672; 198/657; 198/302; 198/315; 198/317; 198/318
[58] Field of Search ........... 414/304, 305, 313, 314, 414/319, 320, 321, 322, 326, 526, 523, 133; 198/317, 318, 302, 315, 518, 587, 589, 778, 672, 673, 657

[56] References Cited

U.S. PATENT DOCUMENTS

| | | | |
|---|---|---|---|
| 1,919,972 | 7/1933 | Wynn, Jr. | 198/587 |
| 2,360,776 | 10/1944 | Kozak et al. | 198/672 X |
| 3,190,469 | 6/1965 | Huffman | 414/319 X |
| 3,403,795 | 10/1968 | Schaefer | 198/657 X |
| 3,547,283 | 12/1970 | Beebe et al. | 414/320 |
| 3,552,546 | 1/1971 | Rath | 198/318 X |
| 3,872,982 | 3/1975 | Rowland-Hill et al. | 414/326 |
| 3,968,998 | 7/1976 | Wolf | 414/319 X |
| 4,669,941 | 6/1987 | West et al. | 198/518 X |
| 4,708,567 | 11/1987 | Greeb | 414/326 X |
| 5,099,984 | 3/1992 | Kuzub | 414/319 X |

FOREIGN PATENT DOCUMENTS

| | | | |
|---|---|---|---|
| 1158193 | 12/1983 | Canada | 198/657 |
| 2850334 | 5/1979 | Fed. Rep. of Germany | 198/672 |
| 3827277 | 2/1990 | Fed. Rep. of Germany | 198/518 |
| 197230 | 8/1989 | Japan | 414/526 |
| 274650 | 4/1951 | Switzerland | 198/318 |

*Primary Examiner*—Frank E. Werner

[57] ABSTRACT

This invention relates to a grain storage unloading system of a type which can be moved from grain bin to grain bin and includes a sweep section which can rotate relative to a discharge section to sweep a circular area within the bin and to carry the material from the bin outwardly from the bin for collection

20 Claims, 9 Drawing Sheets

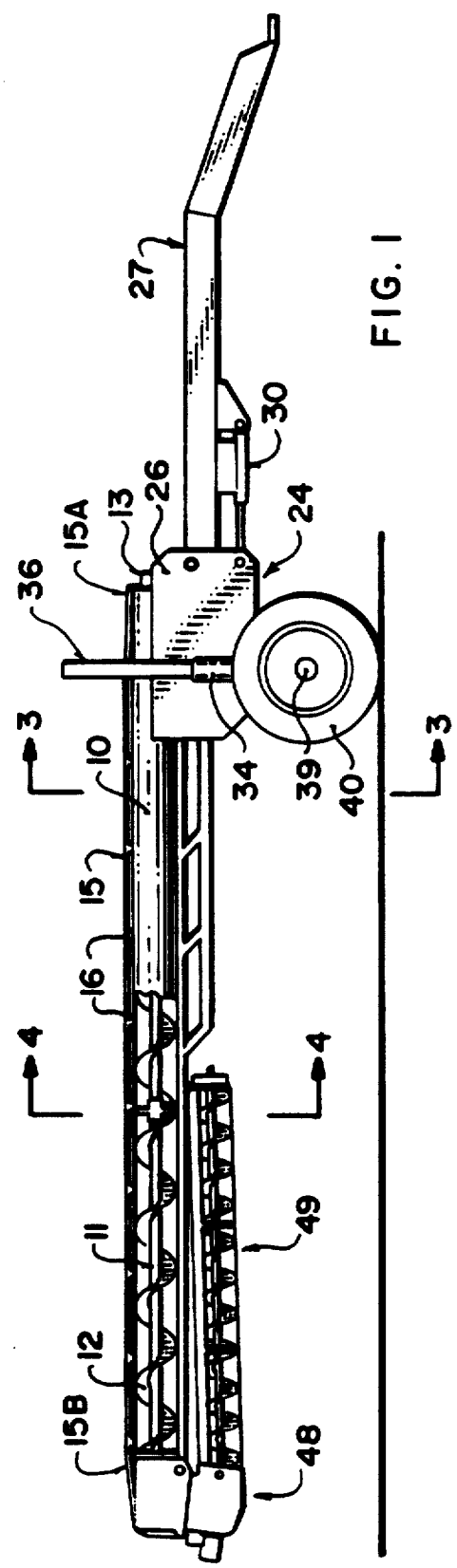
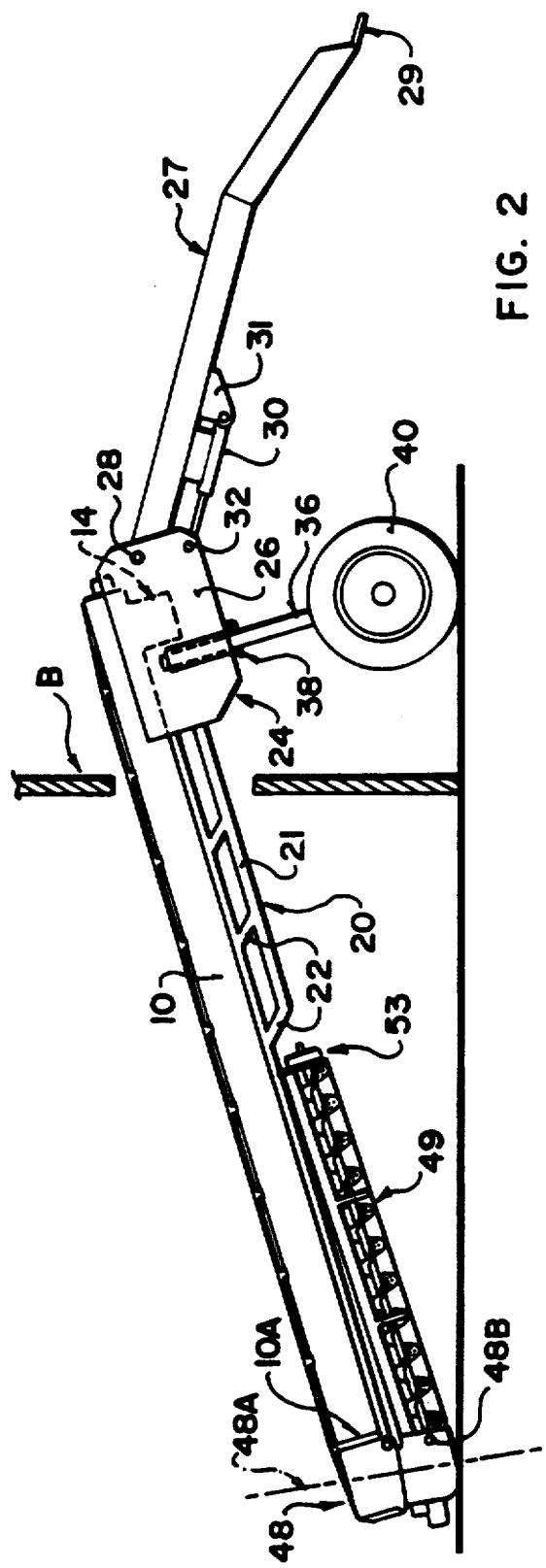

GRAIN STORAGE UNLOADING SYSTEM

BACKGROUND OF THE INVENTION

This invention relates to a grain storage unloading system of a type which can be moved from grain bin to grain bin and includes a sweep section which can rotate relative to a discharge section to sweep a circular area within the bin and to carry the material from the bin outwardly from the bin for collection.

In U.S. Pat. Nos. 5,099,984 and 5,099,986 of Danny S. Kuzub is disclosed a machine of the above general type. This machine has a number of highly advantageous features relative to the prior art.

Other devices for discharging materials from a bin are shown in U.S. Pat. Nos. 4,824,312 (Schiltz), 4,619,577 (Swanson), 4,029,219 (Rutten), and 4,669,941 (West). The prior art documents have a number of disadvantages including the fact that in most cases they are dedicated to a single bin and hence constitute a significant capital investment for each of the bins. In addition the sweep section is in most cases limited to movement over less than 360° since it cannot sweep past the discharge section. This tends to leave quantities of grain which are uncollected so the farmer is again obliged to carry out the detested shovelling.

The above patents of Kuzub therefore represent a significant advance over the art and have led to a highly improved machine.

However further development of the machine has led to yet further improvements which provide improved mechanical reliability.

SUMMARY OF THE INVENTION

It is one object of the present invention, therefore, to provide an improved machine of the above type in which a number of mechanical functions are significantly improved.

It is a further object of the present invention to provide an improved machine of the above type in which the machine can accomodate bins of different design having bin discharge openings at different locations on the wall of the bin.

It is a further object of the present invention to provide an improved machine of the above type in which the drive connection from the discharge section to the sweep section is mechanically improved for more reliable operation.

It is a further object of the present invention to provide a machine of the above type in which the forwarding drive action of the sweep auger is provided by a mechanical drive connection which is of improved reliability.

It is a yet further object of the present invention to provide an auger arrangement which can be used as the main discharge section in which the auger flighting is supported in a manner which reduces abrasion between the auger flighting and the auger tube within which it rotates and which reduces grain damage due to crushing between the auger flighting and the tube.

The invention therefore provides generally a lift system for the machine in which the discharge end can be lifted on a pair of upwardly extending struts by operation of the single hydraulic cylinder which actuates the tilting action of the main auger tube.

A hanger bearing is provided within the main discharge auger for supporting the flighting relative to the tube.

An improved coupling is provided between the lower or feed end of the main discharge section and the discharge end of the sweep section including an internal hydraulic fluid coupling to provide hydraulic fluid to a drive motor mounted at the inner or discharge end of the sweep section.

A modified drive system for forwarding the sweep section is provided which operates on an eccentric which drives a lever operating on a one way clutch to intermittently rotate a toothed drive wheel which thus rotates at a significantly reduced speed relative to the angular velocity of the auger flighting. The forwarding speed can be adjusted by reducing the amount of movement of the lever.

One or more embodiments of the invention will now be described in conjunction with the accompanying drawings.

BRIEF DESCRIPTION OF THE DRAWINGS

FIG. 1 is a side elevational view of the bin sweep auger system of the present invention, showing the machine in a lowered transport position.

FIG. 2 is a side elevational view similar to that of FIG. 1 showing the machine in a raised position for entry into a bin having a particularly raised entry opening with the discharge auger tilted so that the feed end is in contact with the ground.

In the drawings like characters of reference indicate corresponding parts in the different figures.

DETAILED DESCRIPTION

Figure 3:
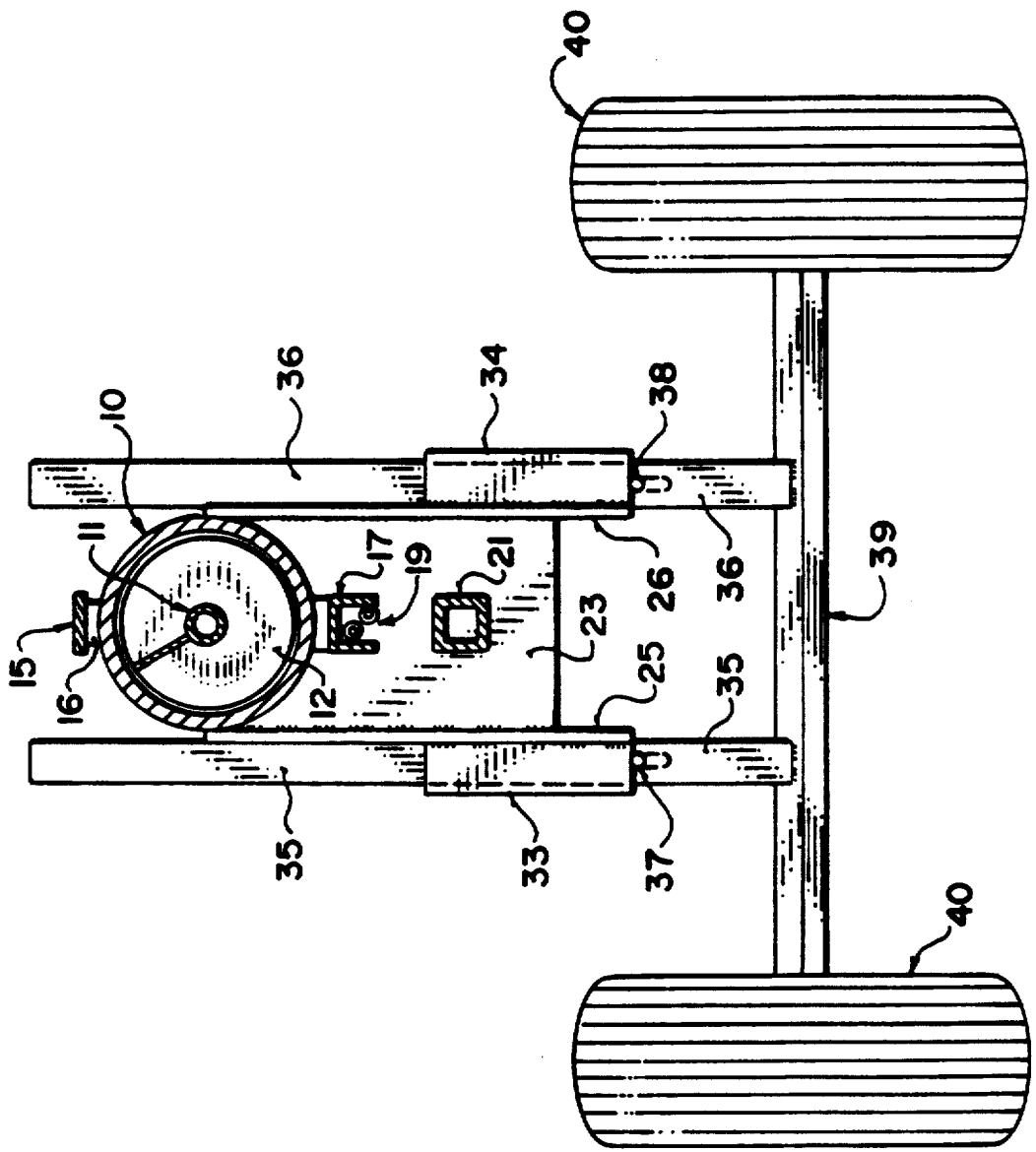
FIG. 3 is a view taken generally along the lines 3—3 of FIG. 1 but with the auger system in an intermediate position between the two extreme positions shown in FIGS. 1 and 2.

Reference is firstly made to U.S. Pat. Nos. 5,099,984 and 5,099,986 of Danny S. Kuzub which disclose an arrangement of the same general type with which the present invention is concerned.

Thus as shown in the previous patent, the device mounted within a bin 8 and moveable therefrom comprises generally a discharge auger including a discharge tube 10, a core mounted within the tube 10, a flighting carried on the core 11, the core being arranged for rotational driving movement by a hydraulic drive motor 13. The auger comprises a conventional cylindrical tube 10 having a feed end or lower end and a discharge spout 14 at an upper end immediately adjacent the drive motor 13.

An upper surface of the tube 10 is protected and stiffened by an elongate strap 15 which has an end 15A welded to the tube adjacent the motor 13 and an end 15B attached to an end coupling casting 41 as described hereinafter. The strap is supported at spaced position from the upper surface of the tube by a plurality of spacer elements 16 which are welded to the strap and the tube at spaced positions along the length of the tube.

On the underside of the tube 10 is mounted a channel member 17 extending along the full length of the tube substantially from the discharge mouth 14 to the lower end 10A. The channel 17 includes a base web welded to the tube at spaced positions indicated at 18 in FIG. 4. The channel also includes two side walls extending downwardly from the base web which define a receiving area for longitudinally extending hydraulic fluid hoses 19 described hereinafter.

Thus the upper surface of the tube and the lower surface of the tube are protected against impact damage and are stiffened by the channel and by the strap so that the tube, if inserted through a relatively narrow opening in a bin, cannot be damaged by impact from the top or the bottom. In addition the strap and the channel provide stiffening to allow for cantilever support of the lower end of the tube and the sweep auger described hereinafter.

The channel 17 is further stiffened by a truss type structure 20 including a bottom tube 21 and a plurality of transverse stiffening elements 22 extending between the channel and the tube 21.

The upper end of the tube is attached to a support structure generally indicated at 24 including a front plate 23 and two side plates 25 and 26. Each side plate extends along the upper part of the tube at the sides of the tube, with the uppermost edge of the plate welded to a respective side of the tube, to a position just beyond the end of the tube and defining a protection area for the motor 13. The front plate 23 includes an upper semi circular edge engaging around the lower surface of the tube and welded thereto. Side edges of the front plate 23 are welded to the front edges of the side plates 25 and 26. The support structure thus defined is a generally rectangular structure which has sufficient strength to support the tube in the cantilever arrangement.

The end of the support structure remote from the tube is attached to a hitch arm 27 by a transverse pivot pin 28 extending through the side plates 25 and 26. The hitch arm 27 extends forwardly from the support structure to a hitch coupling 29 for attachment to a suitable towing vehicle of the type including hydraulic fluid supply for actuating the hydraulic motors and hydraulic cylinder as described hereinafter.

The hitch is thus pivotal on the pin 28 relative to the support structure and this pivotal movement is actuated by a hydraulic cylinder 30 carried upon a bracket 31 on the underside of the arm 27, an end of the piston of the cylinder 30 being connected to a transverse pivot pin 32 at the bottom of the support structure. Thus retraction of the cylinder 30 tends to pivot the tube 10 downwardly in a transport position shown in FIG. 2 and extension of the cylinder causes the tube to be raised to a transport position shown in FIG. 1 in which the tube 10 can be towed behind the vehicle and is supported on the support structure in cantilever arrangement.

On each of the side plates 33 and 34 is attached a vertical square sleeve 33, 34 which is mounted at the lower edge of the plate and extends upwardly therefrom to a position partway along the height thereof. Each of the sleeves 33 and 34 receive a respective one of a pair of struts 35 and 36 slidable therein and of a similar rectangular cross section to act as a sliding fit. The position of the strut in the sleeve can be adjusted and located by the insertion of a respective one of a pair of locating pins 37 and 38 into one of a plurality of holes provided along the length of the struts 35 and 36. The lower end of each of the struts 35 and 36 is attached to a transverse horizontal axle 39 which carries at each end a respective one of a pair of wheels 40.

The height of the support structure 24 relative to the axle 39 can thus be adjusted by the simple expedient of actuating the cylinder 30 from the position shown in FIG. 1 to lower the outer end of the tube 10 to the ground. With the outer end thus supported on the ground, further actuation of the cylinder 30 acts to lift the support structure 24 away from the axle 39. The locating pins 37 and 38 can then be removed and replaced at a higher position on the struts 35 and 36 to hold the support structure at the raised position. When the cylinder is then retracted, the support structure is held at the raised position and the outer end of the tube is lifted away from the ground. In this position the device can be moved into location for operation. The height of the support structure thus locates the height of the tube to accomodate different positions of the opening in the peripheral wall of a bin to be swept.

The upper end of the core 11 is mounted upon bearings (not shown) at the motor 13 on an end wall of the tube 10. At a lower end 10A of the tube there is provided a first casting 41 of a pair of castings 48 which provide coupling between the lower end of the discharge auger and the inner end of the sweep auger. The upper casting includes an end wall 42 carrying bearings 43 for the lower end of the core 11. As the auger is operating in most cases in a substantially horizontal mode, there is significant tendency for the flight 12 to rest against the lower part of the inside of the tube 10. The bearings 43 and the upper bearing are not sufficient to hold the core straight under its own weight and under the weight of the material transported thereby and hence there is an increased tendancy for wear of the outside periphery of the helical flight 12 and the inside surface of the tube. In order to counteract this tendency, a hanger bearing 44 is provided at a position approximately midway along the length of the core 11. The hanger bearing comprises a sleeve 45 shaped to surround the core and extending over a short length of the core. The sleeve 45 carries a plurality, preferably three, of fingers 46 which are attached to the sleeve and extend outwardly therefrom in a radial plane of the longitudinal axis of the core and equiangularly spaced around the axis. On the interior of the sleeve 45 is provided a bushing 47 which is cylindrical and extends slightly beyond the ends of the sleeve 45 to provide a bearing effect against the core received on the inside surface of the bushing and against the adjacent portions of the flighting. The flighting is thus divided into two sections 11A and 11B separated at the hanger bearing. Each portion includes a central sleeve 11C and a flighting section attached thereto within which the core extends with the core attached to the sleeve by a fastener 11E. The ends of the sleeve 11C thus abut the ends of the bushing 47 to allow rotation relative to the hanger bearing.

Figure 4:
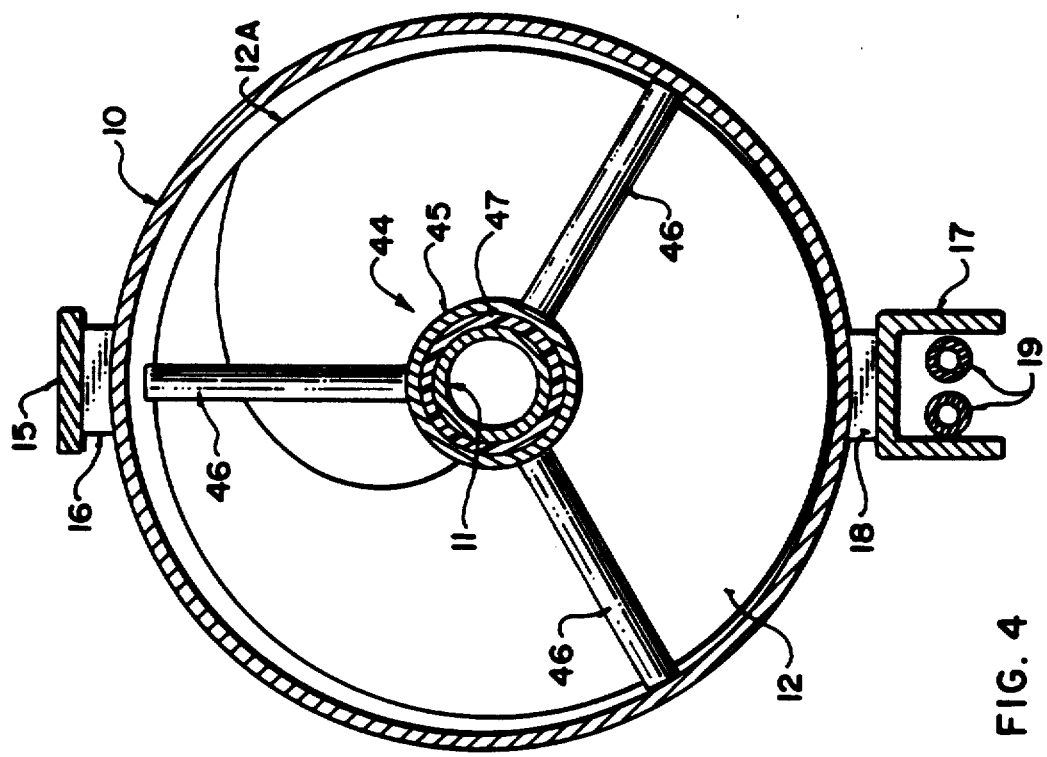
FIG. 4 is a cross sectional view taken along the lines 4—4 of FIG. 1 but omitting the sweep auger.

As shown in FIG. 4, the imaginary circle containing the outside edges of the fingers 46 has a diameter slightly less than that of the inside surface of the tube 10. Thus the fingers can slide longitudinally of the tube but when the fingers reach the required position, the fingers rest against the inside surface of the tube with a slight spacing of an upper one of the fingers from the inside surface of the tube. At the same time the imaginary circle containing the outside periphery of the helical flight 12 has a diameter slightly less than that of the imaginary circle containing the fingers so that the flighting is held away from the inside surface of the tube.

Figure 5:
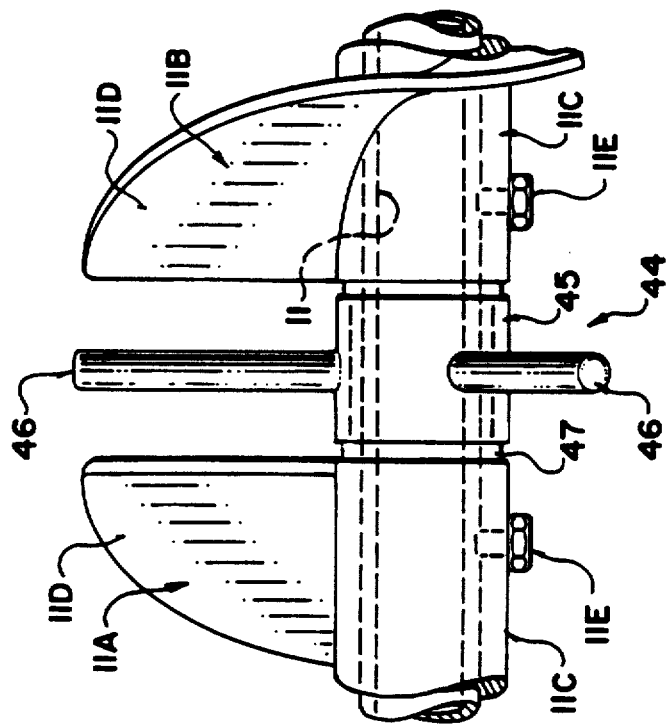
FIG. 5 is a side elevational view of the hanger bearing of FIG. 4 and adjacent portions of the helical flighting.

The hanger bearing is thus not in any way attached to the tube and does not affect the simple construction of the tube or the integrity of the tube. The hanger bearing can simply be installed with the two sections of the flighting as shown in FIG. 5 following which the flighting and the hanger bearing can slide inside the tube during installation to a position at which the hanger bearing is located within the tube and acts as the central bearing without necessity for fastening to the tube.

As shown in the previous patents described above, at a lower end of the tube 10 is provided a coupling arrangement generally indicated at 48 which connects from the lower end of the tube 10 to a sweep auger generally indicated at 49. The details of the sweep auger are not shown in the present application since these can be found in the above mentioned patents, the disclosure which is incorporated herein by reference. In general terms the sweep auger includes a shroud 50 within which is mounted a core 51 carrying a flighting 52. The length of the shroud and the flighting can be adjusted to accomodate different diameters of sweep action. The coupling 48 allows rotation about a substantially vertical axis 48A and also pivotal movement of the shroud 50 relative to the coupling about a transverse axis 48B. In a sweeping action a forwarding movement is provided by a drive system generally indicated at 53 and described in more detail hereinafter.

Figure 6:
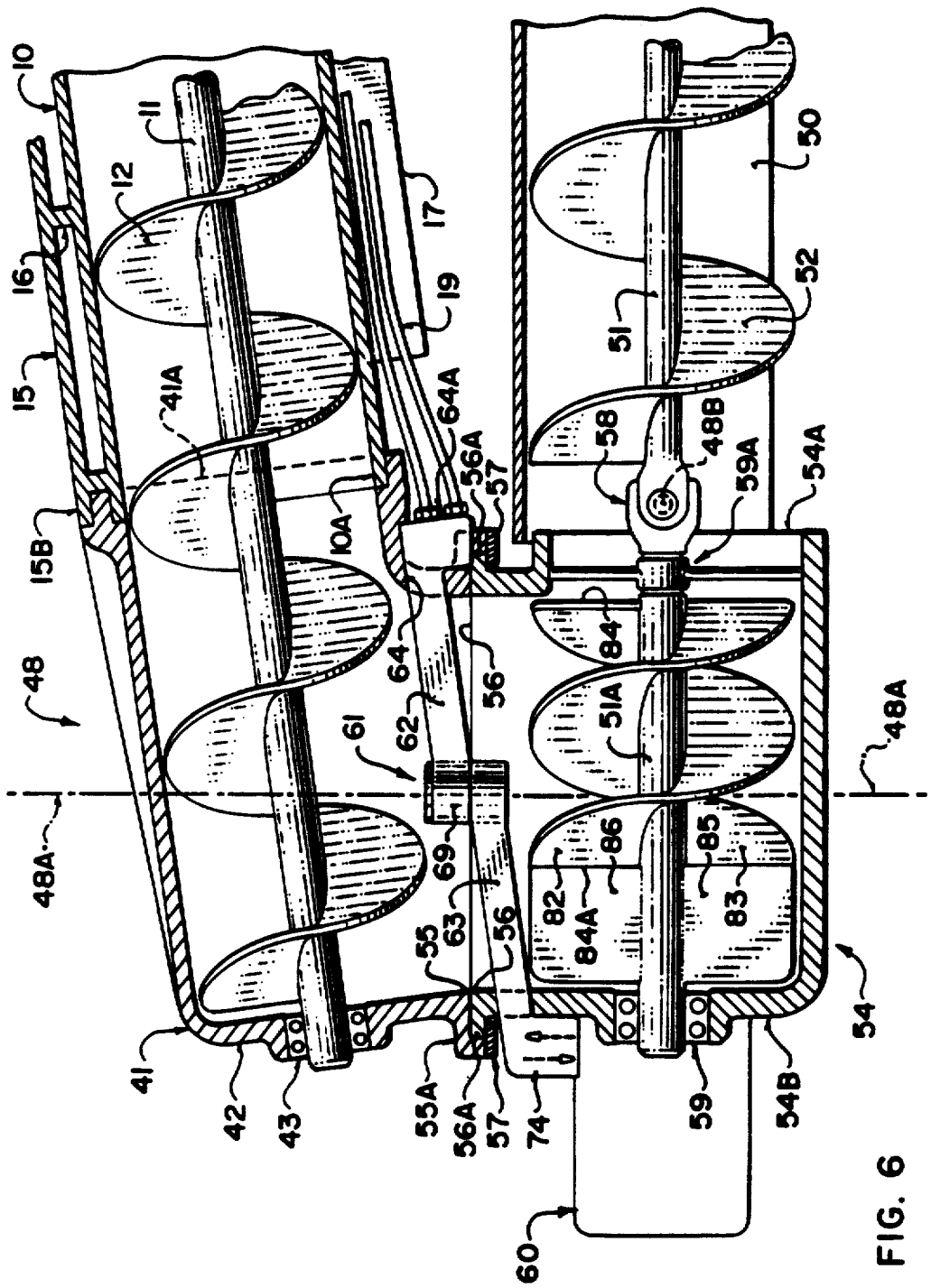
FIG. 6 is a vertical cross sectional view through the machine of FIG. 1 taken at the couplings between the main discharge auger and the sweep auger.

The coupling arrangement 48 which provides drive force for the core 51 and which allows transmission of the material from the sweep auger to the discharge auger is shown in most detail in FIG. 6. This comprises the elbow casting 41 which is attached to the lower end of the tube 10 and a second elbow casting 54 which is attached to the end of the sweep auger 49. In general terms each of the elbow castings includes a generally circular end face through which the respective flighting passes. Thus the casting 41 includes the end face 41A through which the flighting 12 passes with the end face being attached to the end 10A of the tube as described herein before. Similarly the casting 54 includes an end face 54A which is pivotally connected to the end of the shroud 50 for pivot action of the shroud 50 about a transverse pin 48B. The end face 54A is shaped to receive the flighting 52 passing therethrough on the core 51.

In addition each of the coupling castings 41 and 54 includes a cooperating circular end face 55 of the casting 41 and an end face 56 of the casting 54. These end faces are shaped to allow rotation of one relative to the other about the axis 48A. The end faces 55 and 56 also are shaped to connect and hold the castings in engagement. The casting 41 thus includes a flange 55A and a retaining ring 57 which wraps around a flange 56A on the face 56 to hold the castings in engagement. Suitable bushing arrangements are provided between the surfaces to allow free rotation without wear. The diameter of the circular end faces 55 and 56 is greater than that of the end face 41A to provide an increased area for communication of the material between the sweep auger and the discharge auger.

Figure 7:
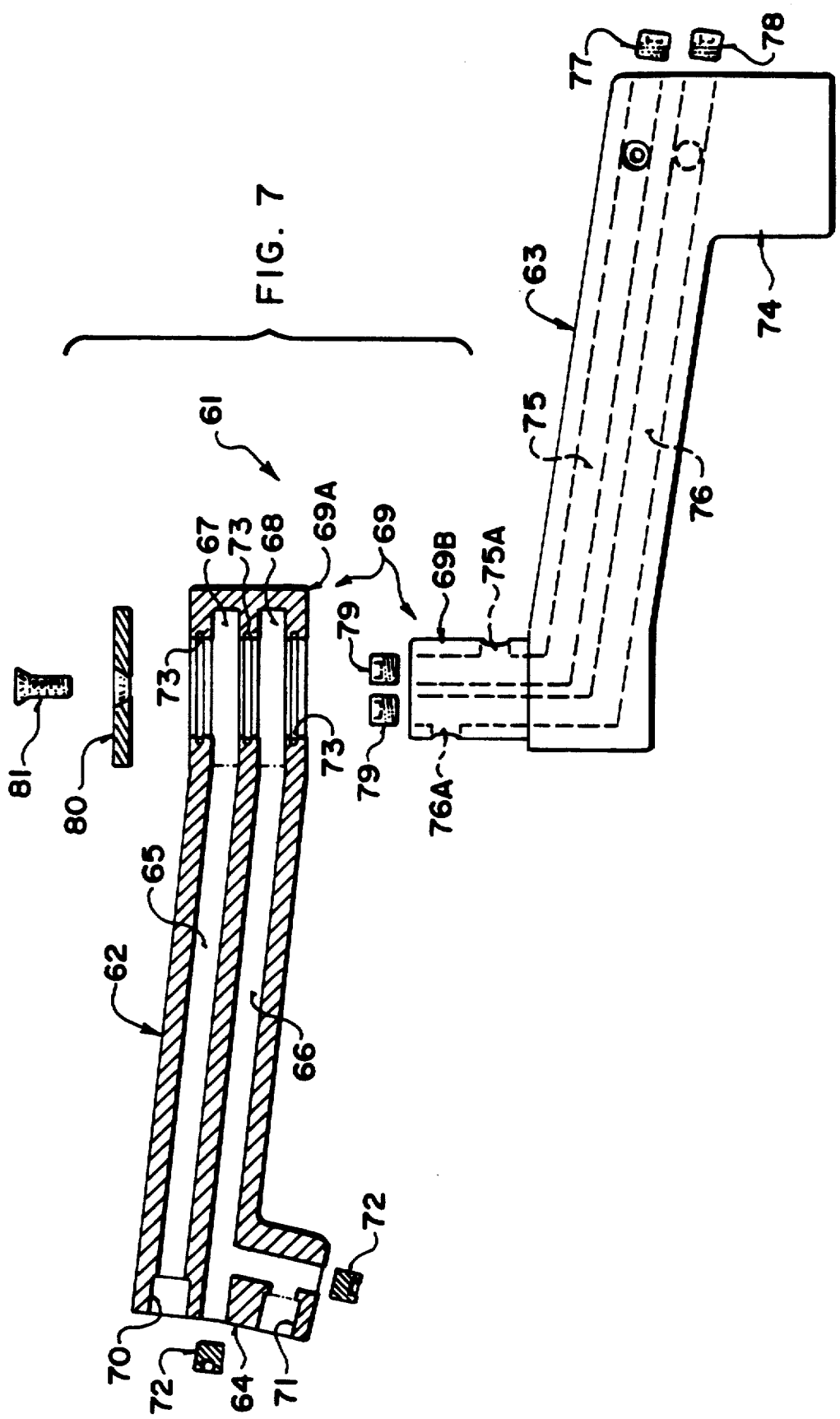
FIG. 7 is an exploded view of the hydraulic coupling mechanism for communicating hydraulic fluid from the feed lines attached to the main discharge auger to the hydraulic motor of the sweep auger.
Figure 8:
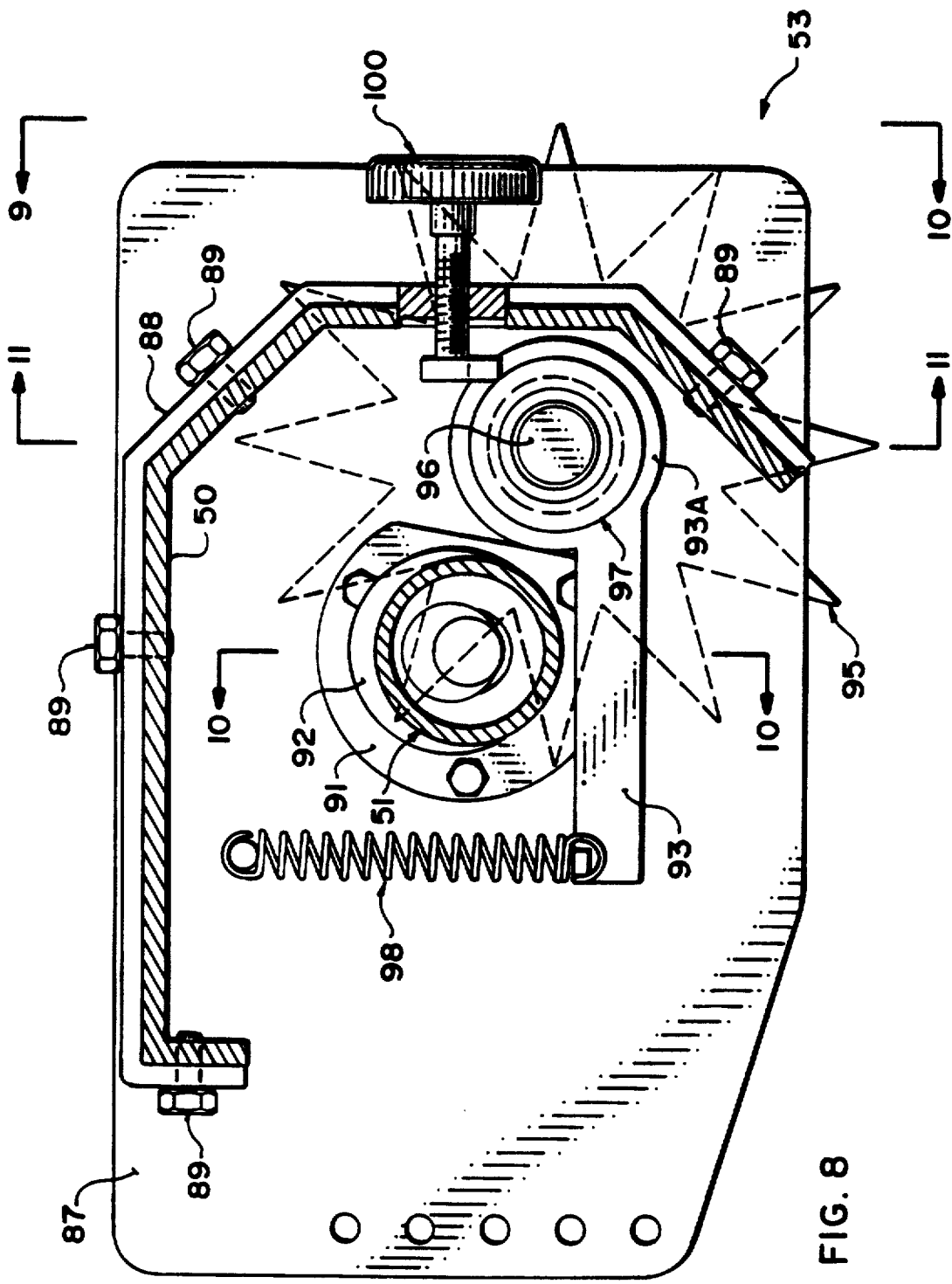
FIG. 8 is a vertical cross sectional view through the sweep auger adjacent the outer end thereof omitting for convenience of illustration the auger flighting, the cross section being taken along the lines 8—8 of FIG. 9.
Figure 9:
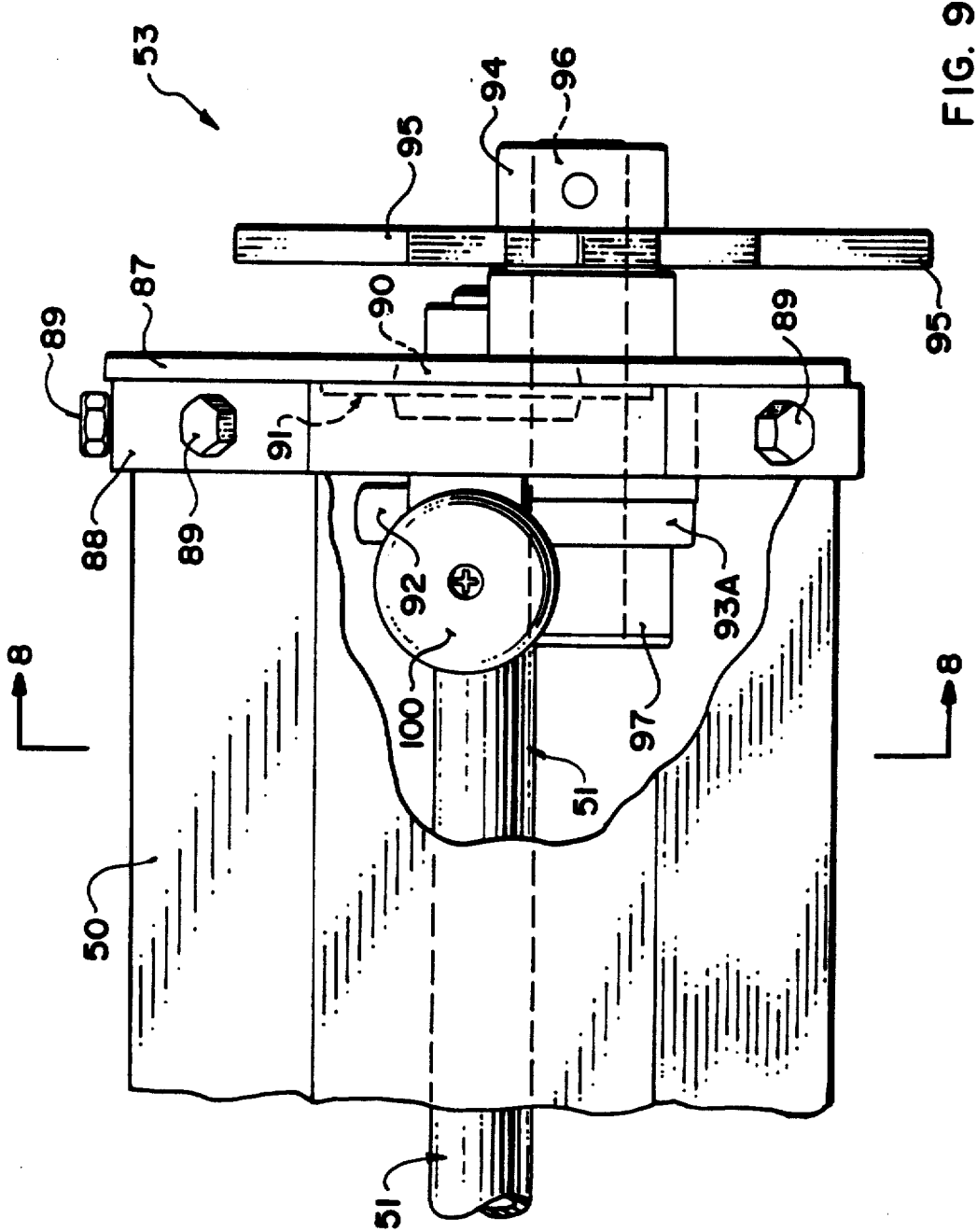
FIG. 9 is rear elevational view of the end portion of the sweep auger, the elevation being taken along the lines 9—9 of FIG. 8, part of the rear shroud of the sweep auger being broken away to show the drive mechanism.
Figure 11:
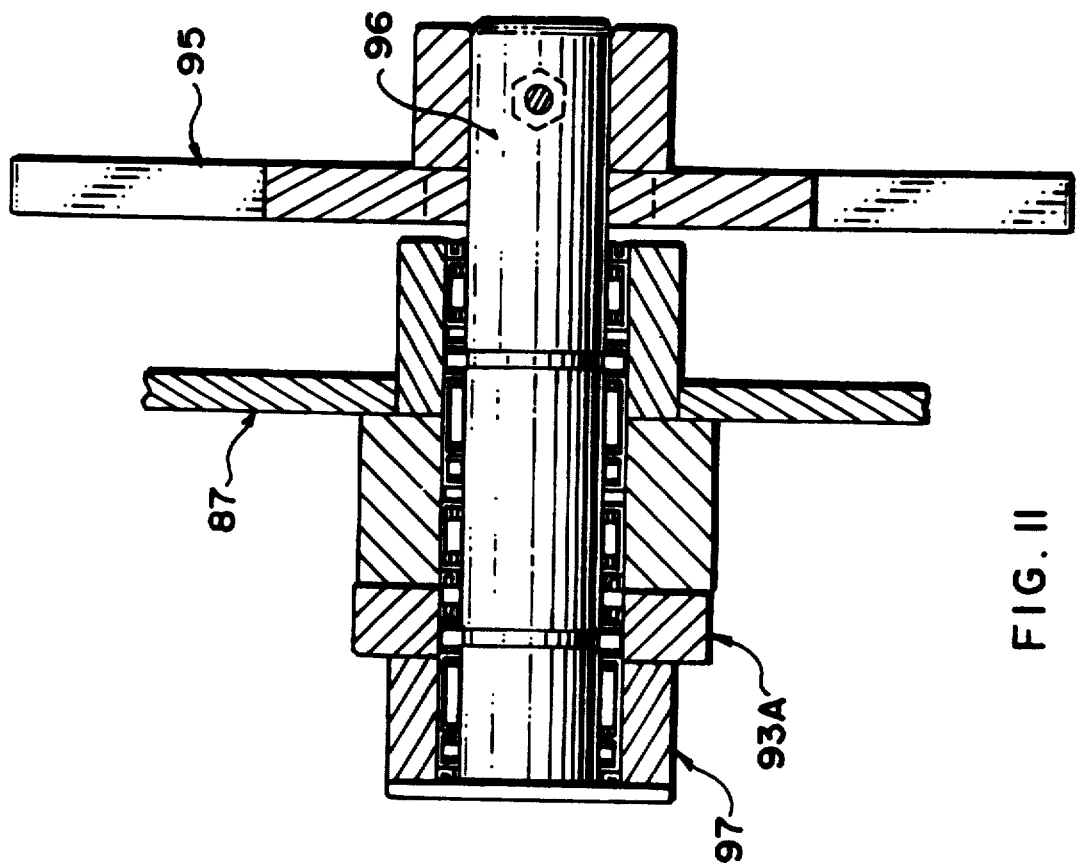
FIG. 11 is a cross sectional view along the lines 11—11 of FIG. 8.
Figure 10:
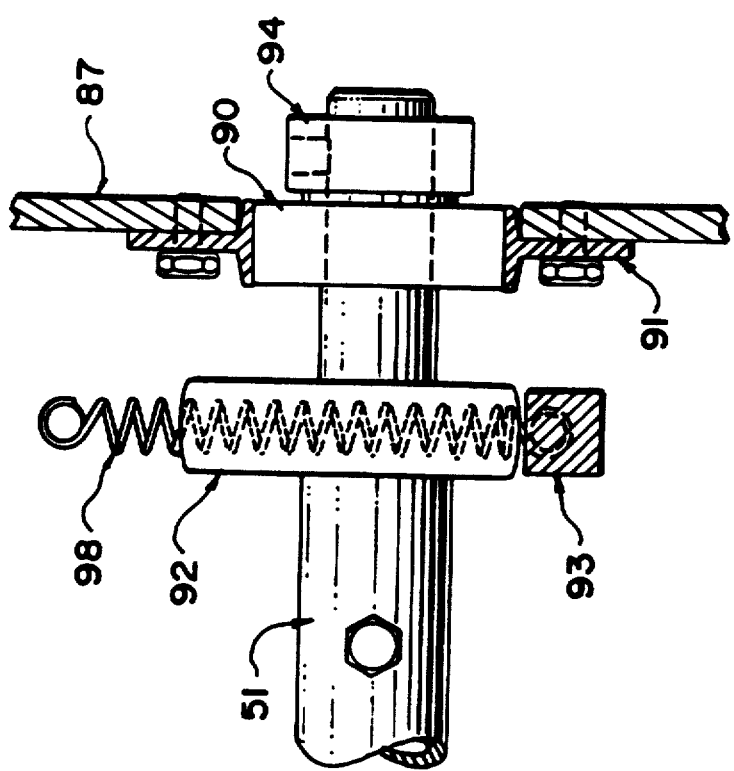
FIG. 10 is a cross sectional view along the lines 10—10 of FIG. 8.

The core 51 includes a universal coupling 58 at a position adjacent the end face 54A to allow for the pivotal action of the shroud 50 relative to the coupling 54 while the core 51 rotates. The core 51 thus includes a short section 51A between the universal coupling 58 the end face of the casting 54. The core 51 is supported on an end bearing 59 in the end face of the elbow casting 54, a hanger bearing 59A at the end face 54A and an end bearing 90 (FIG. 8) at the end of the shroud 50. The hanger bearing 59A is similar to that previously described. The core 51 is driven by a hydraulic motor 60 attached to the end face 54B of the casting 54 at the bearing 59. The hydraulic motor is of a conventional nature similar to the hydraulic motor 13 driving the discharge auger. Thus in this arrangement there is no mechanical connection between the discharge and the sweep auger and instead the communication is provided by a hydraulic drive arrangement. The hydraulic fluid lines to the motor 13 are not shown as these will be provided in conventional manner through the hitch arm and through suitable control valves. The hydraulic fluid for the motor 60 however is communicated through the supply lines 19 passing along the channel 17 on the underside of the tube 10. As shown in FIG. 6 these supply lines 19 terminate at the coupling 48 and there is a necessity to supply the hydraulic fluid to the motor 60 through a swivel coupling which allows the sweep auger to rotate continuously about the axis 48A. The swivel coupling is indicated generally at 61 and is shown in side elevational view in FIG. 6 and in exploded view in FIG. 7. The swivel coupling includes a first arm 62 which is fixed relative to the casting 41 and a second arm 63 which is fixed relative to the casting 54. The casting 41 thus includes an opening 64 formed at the end face 57 directly on the underside of the tube 10 so that the supply lines 19 emerging from the channel 17 reach immediately to an end face 64A of the arm 62 at that location. The arm 62 includes a pair of bores 65 and 66 formed therethrough longitudinally each communicating with a respective one of a pair of annular channels 67,68 at a swivel connection 69 between the two arms. The outer end of the bore 65 includes a connector 70 for connection to the supply line 19. The outer end of the bore 66 is machined with branches to a connector 71, the branches being closed by pressure plugs 72. Thus the connector 70 and 71 are spaced sufficiently to receive the supply lines 19 connected thereto.

At the end of the arm 62 at the swivel connection 69, the arm is formed into a generally cylindrical body 69A within which the annular channel 67 and 68 are formed. The annular channels are separated by 0 rings 73.

The arm 63 includes at its outer end a downturned portion 74 which fastens onto the top of the hydraulic motor 60 for communication directly therewith of the fluid from channels 75 and 76 extending longitudinally of the arm 63. The outer end the channel 75 and 76 are branched and include pressure plugs 77 and 78 closing the end of the branches with the channels thus extending downwardly of the end portion 74 for connection to the hydraulic motor. At the inner end, the arm 63 again forms a cylindrical section 69B for insertion into the hollow cylindrical channel within the end portion 69A of the arm 62. The channel 75 breaks out on a side face of the cylindrical portion at the end of the arm in an outlet 75A for communication with the annular channel 68 of the arm 62. Similarly the channel 76 breaks out an outlet 76A for communication to the upper channel 67 of the arm 62. Pressure plugs 79 close the branch portions of the channels 75 and 76 at the inner ends. The cylindrical section 69B of the arm 63 carrying the outlet 75A and 76A is thus inserted into the hollow area forming the interior of the end portion 69A at the arm 62 following which an end cap 80 is applied onto the portion 69B and fastened to the arm 63 by a screw 81. The arm 63 and the portion 69B can thus rotate relative to the arm 62, the portion 69A and to the end plate 80 and allows communication of the fluid from the arm 62 to the rotating arm 63 for driving the hydraulic motor. The outside diameter of the portion 69 is arranged to be as small as possible so that it does not interfere with the communication of the material from the auger flight of the sweep auger to the auger flight of the discharge auger. The arms 62 and 63 similarly are arranged to be of minimum diameter so that material can pass by the arms over the majority of the area of the circle forming the end faces of the couplings 48 and 54. As stated before the diameter of the circle containing the end faces 55 and 56 is increased relative to the diameter of the flights so as to provide an area sufficient to receive the material therethrough despite the restrictions provided by the arms 62 and 63 and the central hub area 69. The castings 41 and 54 have a central area at the interconnecting faces 55 and 56 which raises the flight of the discharge auger away from the flight of the sweep auger sufficiently to receive the arms and the central hub area 69 therebetween without interconnection or engagement therebetween.

Between the universal joint or coupling 58 and the bearing 59 is provided a short auger section acting as a drive element for transmitting the material from the lower casting 54 into the upper casting 48. This auger section includes two helical flight sections 82 and 83 arranged at 180° angular spacing and each extending over 360° of helical flight. Thus the flight sections 82 and 83 each extend from a line 84 extending diametrically of the core 51 through 360° to a second line 85 parallel to the line 84 and similarly diametrical to the core 51. The flighting portions 82 and 83 thus provide a double helix arrangement of a helix angle effectively half that of the remainder of the auger flighting. The line 84 at which both the portion 82 and 83 terminate is also attached to a pair of blades 85 and 86 lying in an axial plane of the core with the blade 85 opposite to the blade 86. These blades therefore provide an action tending to lift the material so that it cannot become wedged against the end plate 54B but instead is flipped upwardly to prevent any possible action jamming of the material at the end face 54B. The material then tends to feed upwardly into the casting 48 to be collected by the discharge auger and carried to the discharge outlet 14.

Turning now to FIGS. 8, 9, 10 and 11 there is shown the drive arrangement 53 for forwarding the sweep auger in its circular path around the axis 48. Attached to the end of the shroud 50 is an end plate 87 lying at right angles to the end plate. A flange 88 shaped to follow the periphery of the shroud 50 is attached to the shroud 50 by bolts 89 thus attaching the plate 87 at right angles to the shroud 50. The plate 87 carries a bearing 90 for the end of the core 51, the bearing being mounted in a housing 91 attached to the end plate 87. The core 51 carries an eccentric element 92 which is attached to the core for rotation therewith to provide a cam action on a lever 93. On the end of the core 51 is provided an end thrust member 94.

A toothed drive wheel 95 is mounted on a shaft 96 supported on bearings attached to the plate 87. The shaft 96 is carried in a one way roller clutch arrangement 97. The lever 93 includes an annular end piece 93A attached to one part of the roller clutch and a second part of the roller clutch is attached to the plate 87. Thus a cranking action on the lever 93 around the axis of the shaft 96 causes the toothed wheel 95 to be indexed in the direction allowed by the one way clutch arrangement 97. The one way clutch includes two parts one connected to the lever 93 and one connected to the plate 87 so that each operates in opposition to the other to provide the indexing movement from the cranking action. The cranking action is provided by the engagement of the eccentric member 92 with the lever and a return action provided by a spring 98. Thus each time the eccentric rotates it pushes the lever downwardly acting to move the toothed wheel in the direction of rotation of the lever. As the eccentric releases the lever it is returned by the spring 98 while the roller clutch 97 allows the lever to return without rotating the toothed wheel in the opposite direction. The tooth wheel thus provides incremental movement at a rate proportional to the rotation of the core 51.

In order to adjust the amount of incremental movement for each rotation of the core, a hand wheel 100 is provided which is screw threaded to move inwardly and outwardly to restrict the amount of return movement allowed of the lever 93 under the action of the spring 98. Thus when the hand wheel 100 is screwed inwardly to its maximum extent, the amount of return movement of the lever is reduced to effectively zero so that there is little or no movement of the lever since it is held away from the eccentric. When the hand wheel is rotated to its opposite extreme, the lever follows exactly the movement of the eccentric so that it is moved to a maximum extent causing a maximum amount of movement of the toothed wheel 95.

The toothed wheel 95 includes a plurality of spikes so that each spike can engage through the material onto the ground surface under the material over which the device is running. The toothed wheel thus grasps the ground and provides an effective forwarding force without wear since there is little slippage of the toothed wheel on the ground.

The forwarding movement can therefore be adjusted from a very slow forwarding speed for initial operation and then can be speeded up to a higher speed for a final cleanup. In all cases, however, the amount of rotation of the tooth wheel is significantly less than the angular velocity of the helical flight carried by the core 51. The device is prevented therefore from rotating very rapidly around the sweeping area, which could be dangerous to the user.

Figure 12:
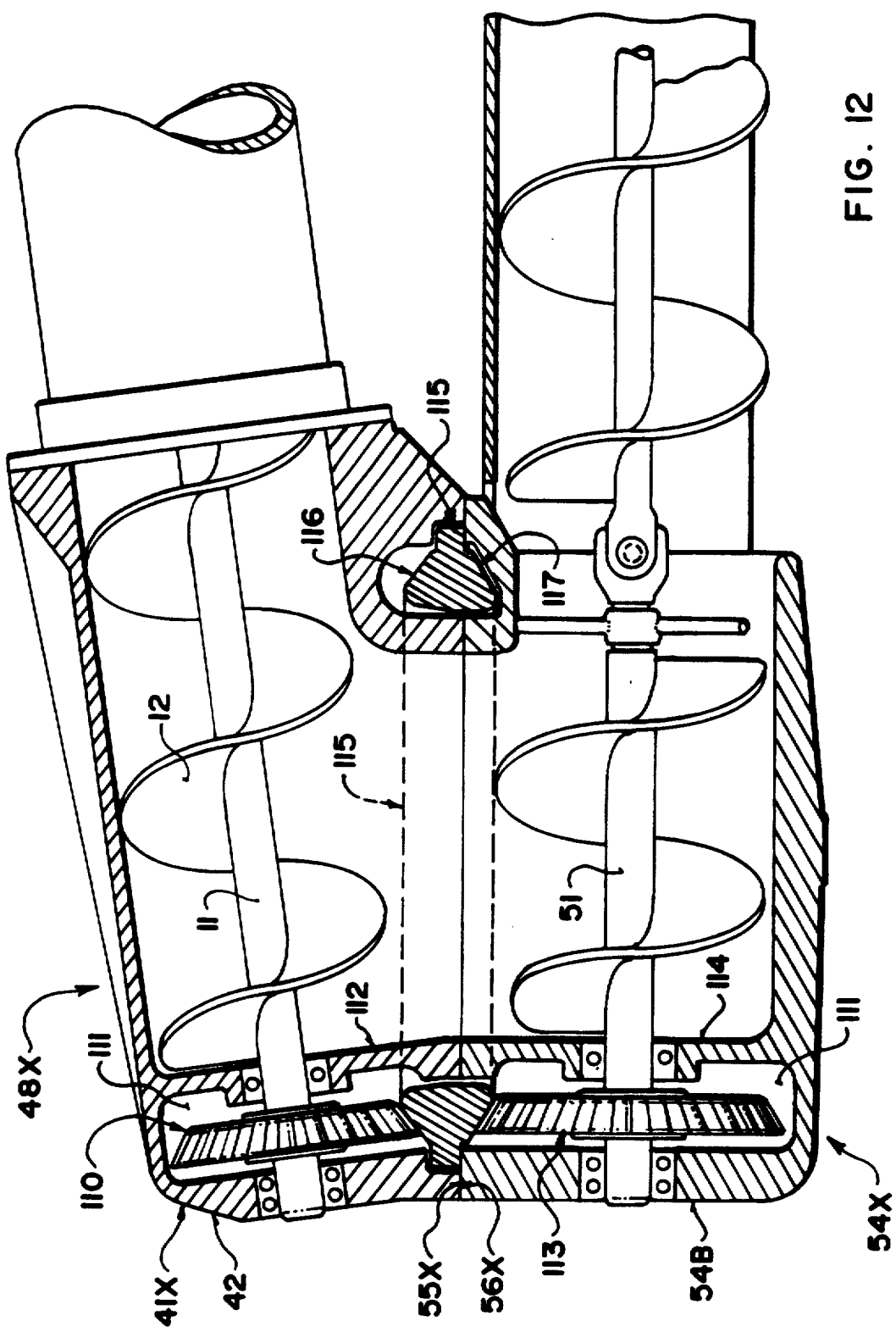
FIG. 12 is a cross-sectional view similar to that of FIG. 6 showing an alternative arrangement of drive coupling between the discharge auger and the sweep auger.

Turning now to FIG. 12 there is shown in vertical cross section the connection between the discharge auger and the sweep auger of a modified arrangement. The connection or coupling is generally indicated at 48X including an upper casting 41X and a lower casting 54X. The remainder of the machine is substantially as previously described including the structure of the discharge auger, the mounting therefore, the sweep auger and the drive system for rotating the sweep auger around the vertical axis defined by the coupling 48X.

The castings 41X and 54X are coupled together for rotation of the casting 54X at the vertical axis relative to the upper casting 41X on the cooperating surfaces 55X and 56X of the castings.

In this arrangement, however, the connection for communicating drive to the sweep auger is provided by a mechanical coupling rather than by the hydraulic coupling previously described. The mechanical coupling comprises a first bevel gear 110 mounted on the end of the core 11 of the discharge auger. The bevel gear 110 is thus driven by the core and is mounted in an oil bath 111 formed by an end wall 112 separating the auger flight from the end face 42 of the casting 41X. The core 51 of the sweep auger carries a similar bevel gear 113 which is connected to the core 51 for rotation therewith and is separated from the end wall 54B of the casting 54X by a dividing wall 114. Drive is communicated from the bevel gear 110 to the bevel gear 113 by a ring gear 115 which has an upper bevel 116 and a lower bevel 117 each communicating with a respective one of the bevel gears 110, 113. The ring gear 115 surrounds the circular opening between the upper and lower castings and is arranged at the periphery thereof at the junction between the surfaces 55X and 56X. The ring gear is thus supported by the castings and able to rotate relative to the castings with a lower casting 54X also free to rotate relative to the ring gear to rotate around the axis. The material can be fed through the hollow opening in the middle of the ring gear. The ring gear is provided in an oil bath defined at the periphery of the castings. Thus all of the three gears are running in an oil bath. In the arrangement shown both the discharge auger and the sweep auger are arranged to rotate substantially at the same velocity but the speed of the sweep auger can be made different from that of the discharge auger by providing a ring gear having a different number of teeth on the bottom relative to those on the top. The discharge auger has a left hand flight while the sweep auger has a right hand flight in order to accomodate the different directions of rotation of the cores 11 and 51. The torque generated by the drive system helps to propel the sweep auger in its rotation around the vertical axis defined by the connection between the castings. In the preferred arrangement as described above, the main drive to cause the rotation of the sweep auger is provided by a toothed wheel at the outer end of the sweep auger. However in an alternative arrangement (not shown) an indexing arrangement can be provided at the gear wheels which causes a restriction in the movement of the gear 113 to cause the gear to move around the ring gear to actuate the rotation about the vertical axis.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A bin sweep comprising a first auger section having a first auger tube, a screw conveyor mounted within the first auger tube with a first core, a first helical flight secured therealong and first means for rotating the first core with the first helical flight about a longitudinal axis of the first core, a second auger section with a second core and a second helical flight secured therealong and second means for rotating the second core with the second helical flight about a longitudinal axis of the second core, said first auger tube being arranged such that it can extend from a first feed end thereof within a bin to be emptied of a stored material to a second discharge end exteriorly of the bin for discharge of the material, means connecting the second auger section to a bottom portion of the first feed end of the first auger section, said connecting means allowing rotation of the second auger section about a substantially vertical axis defined on the first auger section such that the second auger section can rotate around the vertical axis through more than 360° within the bin to collect the material form an area surrounding said first end, drive means for drivingly rotating said second auger section about said vertical axis, and support means for supporting the first auger section for transportation of the first auger section with the second auger section coupled thereto and supported thereby out of said bin, said supporting means being arranged adjacent said second discharge end of the first auger section such that the supporting means can be arranged exteriorly of the bin to insert the first auger section, said connecting means and said second auger section into a position adjacent a center of the bin, said supporting means including means for raising and lowering said second discharge end of the first auger tube and means for changing the angle relative to a horizontal position of the first auger tube such that, with the second discharge end raised and supported at a required height, the first feed end of the first auger tube can be raised and lowered.

2. The bin sweep according to claim 1 wherein said support means comprises a support member rigidly connected to the first auger tube adjacent the second discharge end of the first auger tube, ground wheel means for engaging ground, means interconnecting the ground wheel means and the support member for relative movement in a substantially vertical direction so as to raise and lower the support member and the second discharge end, a hitch arm having a hitch coupling at a forward end for attachment to a towing vehicle, the hitch arm being connected to the support member adjacent a rear end of the hitch arm for pivotal movement about a horizontal axis, and means for actuating relative pivotal movement between the hitch arm and the support member to cause said change in angle of the first auger tube relative to the horizontal.

3. The bin sweep according to claim 2 wherein said means for actuating relative pivotal movement comprises a hydraulic cylinder connected between the hitch arm and support member.

4. The bin sweep according to claim 2 including means for latching said interconnecting means at different heights of the support member relative to the ground wheel means, said interconnecting means and said means for actuating relative movement being arranged such that, with the first feed end of the first auger tube being supported in fixed position relative to the ground, said means for actuating relative movement provides the motive force for moving the interconnecting means for raising and lowering said second discharge end and said support member relative to the ground and relative to said ground wheel means.

5. The bin sweep according to claim 4 wherein the interconnecting means comprises a substantially vertical strut and a sleeve within which the strut can slide, one of the vertical strut and the sleeve being connected to the ground wheel means and the other of the vertical strut and sleeve being connected to the support member.

6. The bin sweep according to claim 1 wherein the first auger tube includes a first protective bar attached thereto and extending longitudinally thereof along a top surface thereof and a second protective bar connected thereto and extending longitudinally thereof along a bottom surface thereof, the first and second protective bars providing means for stiffening the first auger tube and means for preventing contact of the top and bottom surfaces of the first auger tube with surfaces of a bin.

7. A bin sweep comprising a first auger section having a first auger tube, a screw conveyor mounted within the first auger tube with a first core, a first helical flight secured therealong and first means for rotating the first core with the first helical flight about a longitudinal axis of the first core, a second auger section with a second core and a second helical flight secured therealong and second means for rotating the second core with the second helical flight about a longitudinal axis of the second core, said first auger tube being arranged such that it can extend from a first feed end thereof within a bin to be emptied of a stored material to a second discharge end exteriorly of the bin for discharge of the material, means connecting the second auger section to a bottom portion of the first feed end of the first auger section, said connecting means allowing rotation of the second auger section about a substantially vertical axis defined on the first auger section such that the second auger section can rotate around the vertical axis through more than 360° within the bin to collect the material from an area surrounding said first end, drive means for drivingly rotating said second helical flight about an axis longitudinal thereof, said drive means comprising a hydraulic motor connected to said second helical flight at said first feed end of said first auger tube and communicating means for communicating hydraulic fluid along the first auger tube from the second end thereof to the hydraulic motor, said communicating means comprising a first portion thereof connected to and fixed relative to the first auger tube, a second portion thereof connected to and fixed relative to the second auger section and swivel connecting means communicating fluid between the first and second portions.

8. A bin sweep according to claim 7 wherein the first portion includes an arm extending from a position outside the first auger tube to a position within the first auger tube adjacent the vertical axis, wherein the second portion comprises a second arm extending from a position outside the second auger section to a position within the second auger section adjacent the vertical axis and wherein the swivel coupling is mounted at the vertical axis and is of sufficiently small outside dimension to allow passage of the material from the second auger section to the first auger section past the swivel coupling and the first and second arms.

9. A bin sweep according to claim 8 wherein the first auger section includes a first coupling member at the feed end thereof and wherein the second auger section includes a second coupling member at a discharge end thereof, the first coupling member being mounted on top of the second coupling member and defining therebetween an annular swivel connection through which the material passes from the discharge end of the second auger section to the feed end of the first auger section, the annular swivel connection lying in a substantially horizontal plane surrounding the substantially vertical axis of rotation, the first arm being carried by the first coupling member and the second arm being carried by the second coupling member with the swivel connection therebetween being mounted in the horizontal plane at the vertical axis.

10. A bin sweep according to claim 9 wherein the first arm projects to a position outside the first coupling member on an underside of the first auger tube and wherein the second arm projects to a position on the second coupling member opposite to the second auger section, the hydraulic motor being mounted on the second coupling member at the portion of the second arm and being connected thereto.

11. A bin sweep according to claim 9 wherein the second helical flight terminates at the discharge end thereof within the second coupling member and wherein the second helical flight includes at the discharge end thereof blade means rotatable therewith and arranged such that rotation of the blade means about the longitudinal axis of the second helical flight causes lifting movement of the material in a direction upwardly and transversely of the longitudinal axis.

12. A bin sweep according to claim 11 wherein the blade means lies in a substantially axial plane of the longitudinal axis.

13. A bin sweep comprising a first auger section having a first auger tube, a screw conveyor mounted within the first auger tube with a first core, a first helical flight secured therealong and first means for rotating the first core with the first helical flight about a longitudinal axis of the first core, a second auger section with a second core and a second helical flight secured therealong and second means for rotating the second core with the second helical flight about a longitudinal axis of the second core, said first auger tube being arranged such that it can extend from a first feed end thereof within a bin to be emptied of a stored material to a second discharge end exteriorly of the bin for discharge of the material, means connecting the second auger section to a bottom portion of the first feed end of the first auger section, said connecting means allowing rotation of the second auger section about a substantially vertical axis defined on the first auger section such that the second auger section can rotate around the vertical axis through more than 360° within the bin to collect the material from an area surrounding said first end, drive means for drivingly rotating said second helical flight about an axis longitudinal thereof, the first auger section including a first couping member at the feed end thereof and the second auger section including a second coupling member at a discharge end thereof, the first coupling member being mounted on top of the second coupling member and defining therebetween an annular swivel connection through which the material is caused to pass from the discharge end of the second auger section to the feed end of the first auger section, the annular swivel connection lying in a substantially horizontal plane surrounding the substantially vertical axis of rotation, said second helical flight terminating at the discharge end thereof within the second coupling member and being separate from said first helical flight and means for transferring the material from the second coupling member to the first coupling member comprising blade means rotatable with the second helical flight and arranged at an angle different for that of the second helical flight such that rotation of the blade means about the longitudinal axis of the second helical flight causes lifting movement of the material in a direction upwardly and transversely of the longitudinal axis.

14. A bin sweep comprising a first auger section having a screw conveyor with a first core, a first helical flight secured therealong said first means for rotating the first core with the first helical flight about a longitudinal axis of the first core, a second auger section with a second core, a second helical flight secured therealong and second means for rotating the second core with the second helical flight about a longitudinal axis of the second core, means mounting the first auger section such that it can extend from a first feed end thereof within a bin to be emptied of a stored material to a second discharge end exteriorly of the bin for discharge of the material, means coupling the second auger section to a bottom portion of the first end of the first auger section, said coupling means allowing rotation of the second auger section about a vertical axis defined on the first auger section such that the second auger section can rotate around the vertical axis through more than 360° within the bin to collect the material from an area surrounding said first end, and drive means for drivingly roating said second auger section about said vertical axis, wherein said drive means comprises a drive element mounted on said second core at an end thereof remote form said vertical axis and drivingly rotatable about a longitudinal axis of the core for engaging the ground and causing forwarding movement of the second auger section across the ground, and drive connection means for causing rotation of said drive element, said drive connection means comprising means for causing intermittent rotation in angular increments of the drive element in response to each rotation of the second core about said longitudinal axis.

15. The bin sweep according to claim 14 wherein said drive connection means comprises a shaft, means connecting the shaft to the drive element for communicating drive thereto in said forwarding movement direction, a one way clutch connected to said shaft to allow rotation in said forwarding movement direction, a lever connected to said shaft such that cranking movement of the lever causes said intermittent rotation of said shaft in said forwarding movement direction and an eccentric member mounted on the second core for engagement with the lever such that each rotation of the core causes one cranking movement of the lever.

16. The bin sweep according to claim 14 including means for adjusting the angular increment of movement of the drive element caused by each rotation of the core.

17. The bin sweep according to claim 16 wherein said adjusting means comprises means for restricting a distance of movement of the lever in response to each rotation of the core.

18. The bin sweep according to claim 14 wherein the drive element comprises a toothed wheel having a plurality of angularly spaced, radially extending, ground engaging teeth thereon.

19. A bin sweep comprising a first auger section having a first auger tube, a screw conveyor mounted within the first auger tube with a first core, a first helical flight secured therealong and first means for rotating the first core with the first helical flight about a longitudinal axis of the first core, a second auger section with a second core and a second helical flight secured therealong and second means for rotating the second core with the second helical flight about a longitudinal axis of the second core, said first auger tube being arranged such that it can extend from a first feed end thereof within a bin to be emptied of a stored material to a second discharge end exteriorly of the bin for discharge of the material, means connecting the second auger section to a bottom portion of the first feed end of the first auger section, said connecting means allowing rotation of the second auger section about a substantially vertical axis defined on the first auger section such that the second auger section can rotate around the vertical axis through more than 360° within the bin to collect the material from an area surrounding said first end, and a hanger bearing member mounted within the first auger tube at a position spaced from the first feed end and the second discharge end thereof, the hanger bearing member comprising a central hub mounted on the core and defining a bearing surface between the hub and the core to allow rotation of the core relative to the hub and means preventing longitudinal movement of the hub relative to the core, and a plurality of fingers fixed to and projecting outwardly from the hub toward outer ends of the fingers adjacent an inner surface of the first auger tube, there being provided at least three fingers spaced angularly so as to support the hub away form the first auger tube at all positions lying in a radial plane of an axis around the hub, a length of the fingers being such that an imaginary circle containing the outer ends of the fingers has a diameter less than that of the inner surface of the first auger tube and greater than that of a periphery of the first helical flight, the fingers being separate from the first auger tube so as to be slidable therealong in installation of the first helical flight and first core into the first auger tube.

20. The bin sweep according to claim 19 wherein the flight means includes a first portion thereof mounted on the core at one axial face of the hub and a second portion thereof mounted on the core at an opposed axial face of the hub, each of said first and second portions being rotatable relative to the hub.

* * * * *